A. D. COLE.
LINE DRIVE FOR WALKING TRACTORS.
APPLICATION FILED MAR. 22, 1917.

1,252,402.

Patented Jan. 8, 1918.
4 SHEETS—SHEET 3.

WITNESSES:
B. Hall
E. A. Paul

INVENTOR:
ARTHUR D. COLE
BY
Paul & Paul
ATTORNEYS

UNITED STATES PATENT OFFICE.

ARTHUR D. COLE, OF ST. PAUL, MINNESOTA.

LINE-DRIVE FOR WALKING TRACTORS.

1,252,402.  Specification of Letters Patent.  Patented Jan. 8, 1918.

Application filed March 22, 1917. Serial No. 156,757.

*To all whom it may concern:*

Be it known that I, ARTHUR D. COLE, a citizen of the United States, resident of St. Paul, county of Ramsey, State of Minnesota, have invented certain new and useful Improvements in Line-Drives for Walking Tractors, of which the following is a specification.

The object of my invention is to apply a line drive controlling mechanism for the type of tractor shown and described in my pending application for Letters Patent of the United States, Serial No. 144,012, filed January 23, 1917, to the end that the driver of the machine can operate the sets of legs and shoes in the same direction, either forward or backward, or one set in one direction and the other in the opposite direction, or allow one set to be stationary while the other is moved either forward or backward, and thereby have perfect control of the operation of the machine.

The invention consists generally in various constructions and combinations, all as hereinafter described and particularly pointed out in the claims.

Figure 1:
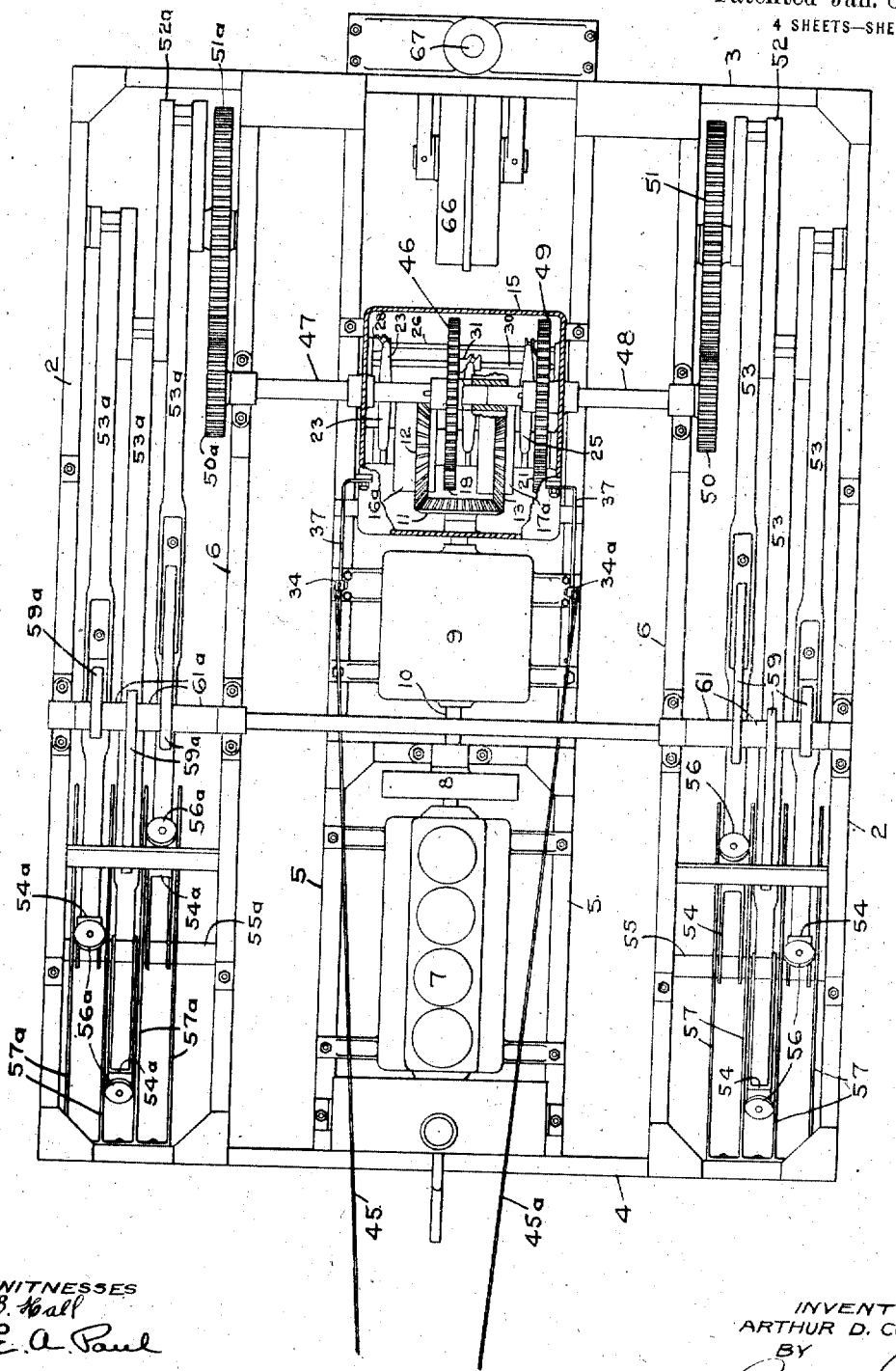
Figure 2:
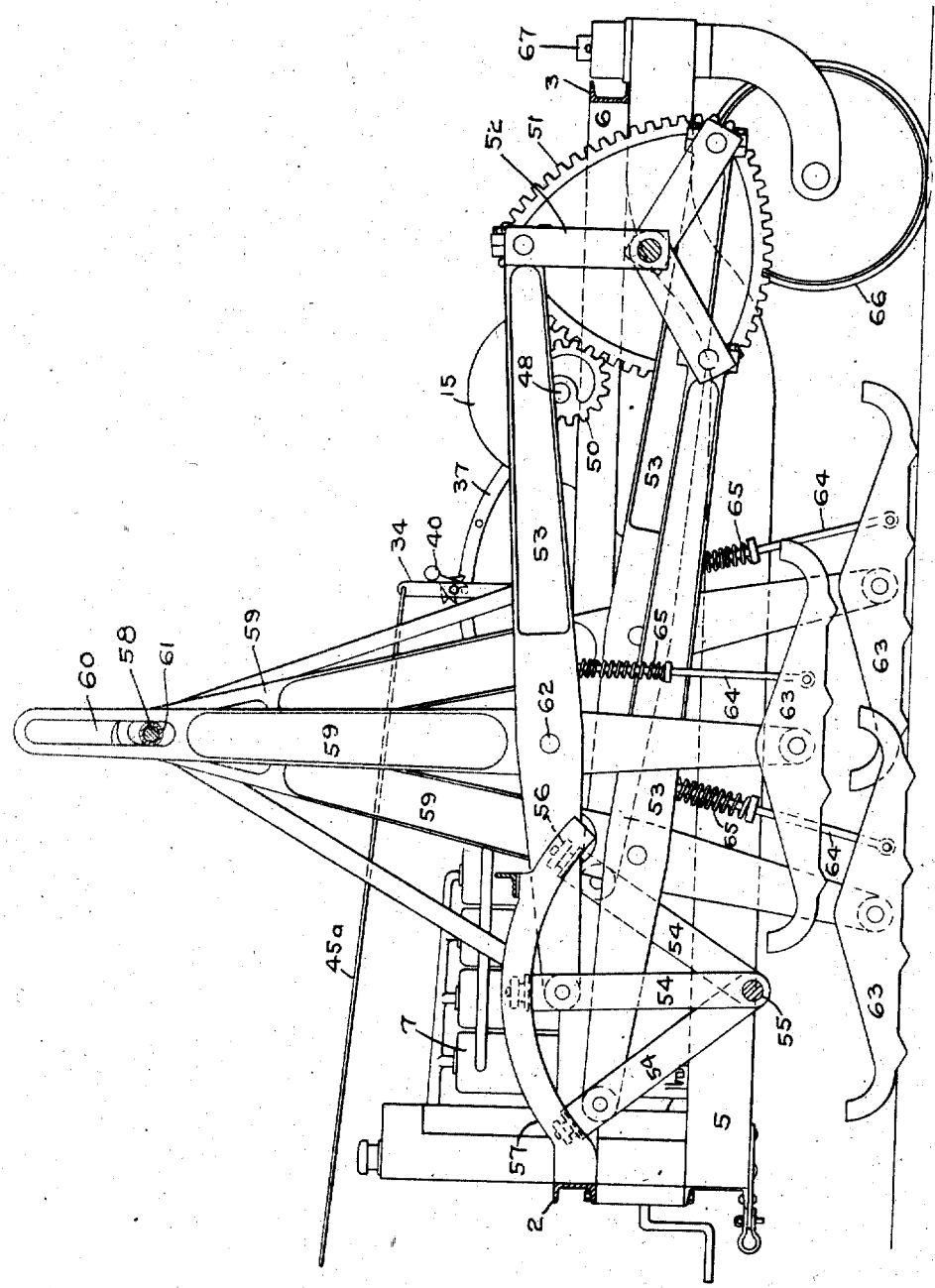
Figure 3:
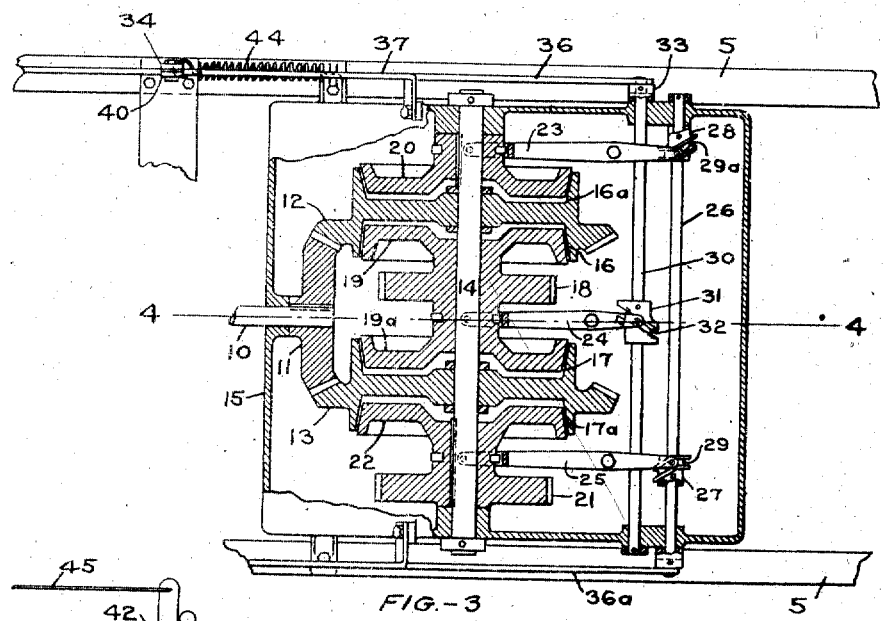
Figure 4:
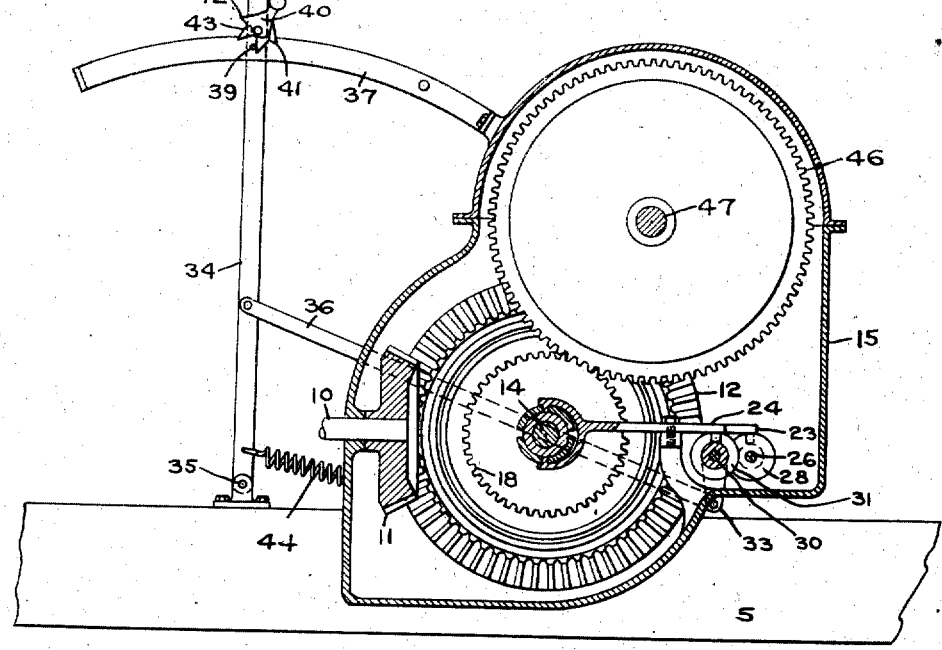
Figure 5:
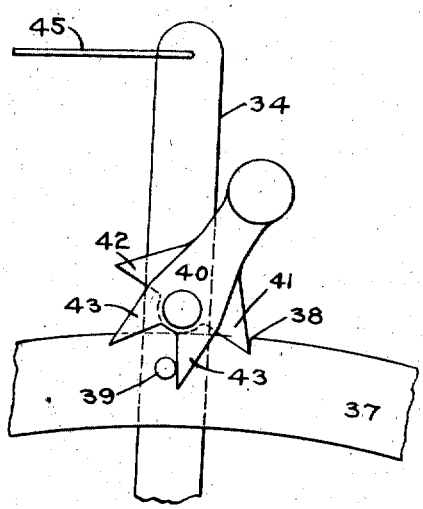
Figure 7:
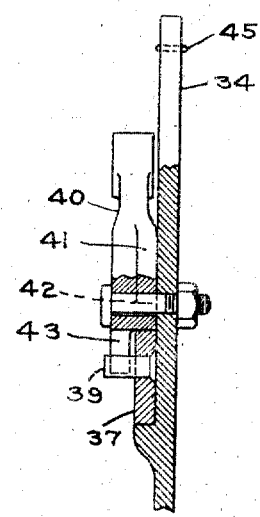
Figure 6:
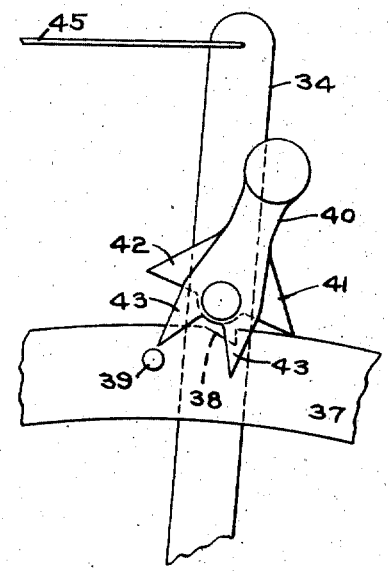
Figure 8:
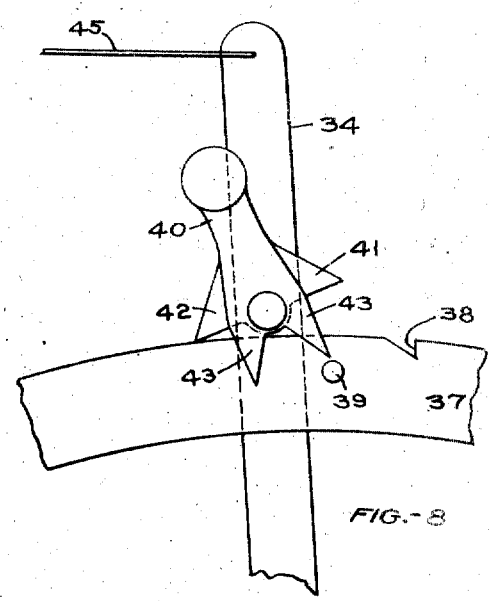

In the accompanying drawings forming part of this specification,

Figure 1 is a plan view of a walking tractor with my line drive controlling means applied thereto, Fig. 2 is a side elevation of the machine, Fig. 3 is a horizontal sectional view through the clutch mechanism, showing the manner of shifting it to change the direction of movement of the traction shoes, Fig. 4 is a vertical sectional view, substantially on the line 4—4 of Fig. 3, Fig. 5 is a detail view of one of the line drive controlling levers and dog therefor, showing the lever and dog in their neutral position, Fig. 6 is a similar view, showing the dog tripped to allow the lever to swing forward and operate the clutch to start the machine, Fig. 7 is a vertical sectional view through a portion of the lever and dog, Fig. 8 is a view corresponding to Fig. 5, showing the lever and dog drawn backward to reverse the driving mechanism.

In the drawing, 2 represents the side rails of the frame, 3 the rails at the front thereof and 4 a rear rail, all preferably made of channel bar on account of its strength and rigidity.

I prefer also to provide rails 5 and 6 parallel with the rails 2 and spaced therefrom and connecting the rails 3 and 4. 7 is an engine of suitable type, preferably internal combustion, mounted between the rails 5 at the rear end of the machine. The engine has the usual fly wheel 8 and a suitable change speed mechanism is arranged within a casing 9 and as this mechanism is of ordinary construction, I have not thought necessary to illustrate or describe it in detail herein.

The engine shaft 10 has a driving gear 11 secured thereon and mounted to mesh with beveled gears 12 and 13 which are loosely mounted on a shaft 14 having bearings within a casing 15. The gears 12 and 13 have clutch members 16 and 16ª and 17 and 17ª formed on opposite sides thereof and a driving pinion 18 is loosely mounted on the shaft 14 between the gears 12 and 13 and has clutch members 19 and 19ª formed on the hub thereof for engagement respectively with the friction surfaces of the clutch members 16 and 17 for transmitting power from the driving shaft through the pinion 18 to the mechanism hereinafter described. One end of the shaft 14 has a clutch member 20 splined thereon for engagement with the clutch member 16ª, and the opposite end of the shaft has a driving pinion 21 corresponding substantially to the pinion 18 with its hub splined on the shaft 14 and provided with a clutch member 22 for engagement with the member 17ª.

For operating the clutch members I provide levers 23, 24 and 25, pivotally supported and having the usual clutch control lever connection with the hubs of the clutch members at one end for shifting said clutch members back and forth on the shaft 14 when the levers are oscillated. For operating these levers, I provide a shaft 26 with hubs 27 and 28 secured thereon and in these hubs I provide cam grooves 29 and 29ª, all substantially the same form, except that they are reversed in position on the shaft, so that one lever, for instance 23, will be neutral when the other lever 25 is being operated. A second shaft 30 is also provided, having a hub 31 secured thereon, provided with a cam groove 32 to receive the lever 24 by means of which the clutch members 19 and 19ª are shifted to lock or release them.

The shaft 30 has a depending arm 33 secured thereon and a lever 34 is pivoted at 35 on the machine frame and is connected by a link 36 with the arm 33. A curved bar 27 is provided near the top of the lever 34 and has a notch 38 therein and a pin 39 is mounted in said bar adjacent to said notch. A dog 40 is pivoted on the lever 34 near the bar 37 and has teeth 41 and 42 upon opposite sides thereof and also has a pair of depending teeth 43. A spring 44 connects the lever 34 with the machine frame and its tension normally holds the lever in the position shown in Figs. 4 and 5 with the tooth 41 in the notch 38 of the guiding bar. This is the neutral position of the lever and the one it occupies when the clutch members are in the position shown in Fig. 3.

The shaft 26 is similarly equipped and I will indicate the link connecting the depending arm with the lever by reference numeral 36ᵃ and the lever by numeral 34ᵃ, the lines attached to these levers being referenced as 45 and 45ᵃ.

Referring now to Fig. 5, if the driver pulls the line 45, the tooth 43 contacting with the pin 39 will rock the dog, lift the tooth 41 out of the notch 38 and upon releasing the line, the depending teeth 43 coöperating with the pin 39 will cause the tooth 41 to ride over the notch and allow the spring 44 to swing the lever 34 to the position shown in Fig. 6.

This movement of the lever will rock the shaft 30 and through the lever 24 and the cam groove on the shaft will shift the pinion 18 and lock the clutch member 19 in engagement with the opposing member 16 and thereupon the gear 12 will drive the pinion 18 which meshes with the large gear 46 on the driven shaft 47, which is journaled on the machine frame. A similar shaft 48 is journaled in said frame end to end, preferably, with the shaft 47 and has a gear 49 thereon which meshes with the pinion 21, the driving of which is controlled through the rocking of the other shaft 26 and the other lever 34ᵃ. The release of this lever will cause the clutch controlling levers 23 and 25 to be oscillated and when the lever is moved in one direction, it will lock the clutch member 20 while the lever 25 will remain inactive or neutral, due to its position in the cam sleeve 29; but when this shaft 26 is rocked in the opposite direction, the reverse will be true, the clutch member 22 being locked while the member 20 is neutral. These members being splined on the shaft, the locking of member 20 to the gear 12 will transmit power through the shaft 14 to the pinion 21 and the gear 49, and when the member 22 is active and the member 20 neutral, power will be transmitted through the gear 13, the shaft 14 and the pinion 21 for driving the mechanism in the opposite direction.

With this mechanism, therefore, I am able by drawing on the lines, to set or release a clutch member and operate the mechanism connected therewith either forward or backward.

It will be noted that when the lever 34 is pulled backward so that the dog 40 swings past the center of its pivot, that it will assume the position shown in Fig. 8, and when released, the tooth 41 will clear the notch 38 and allow the spring to throw the lever forward sufficiently to operate the clutch members.

Having described briefly the line drive mechanism, I will now describe its application to the walking tractor which forms the subject matter of my companion application above referred to.

This walking tractor mechanism and its driving connection with the shafts 47 and 48 are the same on both sides of the machine and I will describe, therefore, the construction on one side indicating the corresponding mechanism on the other side with the same reference numerals and the addition of the exponent "a."

Referring now to Fig. 1, the shaft 48 has a gear 50 eccentrically mounted thereon and meshes with an elliptic gear 51 mounted on a triple crank shaft 52 journaled in the rails 2 and 6 at the front of the machine. Each of the triple cranks has a connecting bar 53 pivoted thereon at one end and pivotally connected with an oscillating arm 54 journaled on a shaft 55 and having antifriction bearing wheels 56 in guides 57 at the rear end of the machine. When the arms 53 are gyrated by the movement of the crank shaft, the arms 54 will oscillate and move forward and backward in vertical planes.

Above the machine frame and extending across it from side to side is a rod 58 and a series of legs 59 having slots 60 at their upper ends to receive the rod 58 and allow freedom of vertical movement of the legs thereon. Suitable collars 61 are mounted on said rod between the legs for guiding them thereon. The lower portions of the legs are pivotally connected at 62 with the corresponding connecting bars, there being one bar for each leg on each side of the machine and forward and backward movement of these bars will impart a corresponding oscillation to the legs, lifting them up and swinging their lower ends forward, all as described in detail in my application above referred to.

There are preferably three legs on each side of the machine, but a greater or less number may be employed. At the lower end of each leg I provide a shoe 63, pivotally attached at its middle portion to the leg and having a pivotal connection through a rod 64 with its corresponding connecting bar. A spring 65 is mounted on each rod for normally holding the shoe in a horizontal position but permitting it to yield and adapt itself to the surface of the ground over which the machine may be moving. When the bars 53 are gyrated by the movement of the crank shafts, the arms 54 will oscillate and cause the shoes 63 to move in straight horizontal planes when in contact with the ground and be lifted well up from the ground as they are moved from one position to another thereon. Movement of the elliptic gears is so timed with respect to the eccentric driving gears that while the latter are on the low point of their peripheries or the point nearest the centers, the elliptic gears will be on the high points and the slowing down of the gear and crank shaft will compensate for the otherwise faster travel of the bar 53 while its crank shaft is passing the lower dead center. This is all specifically described in my walking tractor application.

At the forward end of the machine I provide a caster wheel 66 which is free to oscillate on a central pivot 67 and allow the machine to be turned in either direction. By means of the lines and the clutch mechanism heretofore described the operator of the machine can transmit power to both sets of legs simultaneously or to one set independently of the other for operating it while the other set is stationary, or may operate one set of legs in one direction and the other in the opposite direction and thereby turn the machine within almost its own length.

I claim as my invention:

1. The combination, with a frame and a source of motive power mounted thereon, of legs mounted to oscillate in a vertical plane, bars pivotally connected with said legs respectively, a clutch controlled gear mechanism for driving said bars from said source of motive power, and operating said legs either forward or backward simultaneously, or one set independently of the other or both sets in opposite directions, flexible lines for controlling said clutch mechanism, and traction shoes mounted on said legs and lifted and moved forward or backward by the operation of said legs.

2. The combination, with a frame and a source of motive power thereon, of a plurality of connecting bars upon opposite sides of said frame, an elliptical gear mechanism for operating said bars from said source of motive power, a clutch mechanism for rendering said gear mechanism active or inactive, flexible lines for controlling said clutch mechanism and operating said bars simultaneously or independently of each other and oscillating legs having traction shoes connected with said bars.

3. The combination, with a frame and a source of motive power mounted thereon, of traction means, a clutch controlled gear mechanism for operating said traction means from said source of motive power, there being two sets of gear mechanisms, one for each traction means, independent levers and lines connected therewith for shifting the clutches of said gear mechanisms, and locking dogs for said levers, said dogs being tripped by the backward movement of said levers to release them and shift said clutches.

4. The combination, with a frame and a source of motive power mounted thereon, of a traction means geared to said source of motive power, clutches interposed in said gear for controlling the transmission of power to said traction means; levers connected with said clutches, line attachments for said levers, and automatically operating dogs mounted for locking or releasing said levers through the backward movement and release of said lines.

5. The combination, with a frame and a source of motive power mounted thereon, of legs having traction shoes mounted in said frame, connecting bars for said legs geared to said source of motive power, clutches for controlling the transmission of power to said connecting bars, levers connected with said clutches and having flexible lines attached thereto, notched bars adjacent said levers, dogs pivoted on said levers and having teeth to enter the notches in said bars for holding said levers in a neutral position, said bars also having pins therein and said dogs having teeth depending in position to contact with said pins at a predetermined point in the movement of said levers.

6. The combination, with a tractor having a source of motive power, a traction means and a driving connection between said source of motive power and said traction means, of clutches for controlling said driving connection, levers connected with said clutches, lines attached to said levers and locking dogs mounted to lock said levers in a neutral position or release them to set said clutches when said levers are moved from their neutral position and released.

In witness whereof, I have hereunto set my hand this 16th day of March, 1917.

ARTHUR D. COLE.